(12) United States Patent
Dees et al.

(10) Patent No.: US 11,485,474 B2
(45) Date of Patent: Nov. 1, 2022

(54) FOLDABLE AIRCRAFT WINGS

(71) Applicant: The Boeing Company, Chicago, IL (US)

(72) Inventors: Paul W. Dees, Snohomish, WA (US); Eric Gruner, Seattle, WA (US); Michael Addington, Seattle, WA (US); David Douglas Boes, Bellevue, WA (US); Eric Dwight Blohm, Bellevue, WA (US); Matthew Scott Elenbaas, Mukilteo, WA (US); Rickie Hansken, Marysville, WA (US); Mark John Herzberg, Seattle, WA (US); Eric Sean Kamila, Edmonds, WA (US); Jeffrey Michael Olds, Seattle, WA (US); Charuhas Soman, Bothell, WA (US); Keith Townsend, Everett, WA (US); Steven Paul Walker, Arlington, WA (US)

(73) Assignee: The Boeing Company, Chicago, IL (US)

( * ) Notice: Subject to any disclaimer, the term of this patent is extended or adjusted under 35 U.S.C. 154(b) by 476 days.

(21) Appl. No.: 16/580,762

(22) Filed: Sep. 24, 2019

(65) Prior Publication Data

US 2020/0247526 A1 Aug. 6, 2020

Related U.S. Application Data

(60) Provisional application No. 62/800,176, filed on Feb. 1, 2019.

(51) Int. Cl.
*B64C 3/56* (2006.01)
(52) U.S. Cl.
CPC .................................... *B64C 3/56* (2013.01)

(58) Field of Classification Search
CPC ............ B64C 3/56; B64C 23/072; B64C 5/08
See application file for complete search history.

(56) References Cited

U.S. PATENT DOCUMENTS

| 1,396,177 A | 11/1921 | Fokker |
| 4,778,129 A | 10/1988 | Byford |

(Continued)

FOREIGN PATENT DOCUMENTS

| CN | 109436297 | 3/2019 |
| EP | 2937280 | 10/2015 |

(Continued)

OTHER PUBLICATIONS

European Patent Office, "Extended European Search Report," issued in connection with European Patent Application No. 19218619.5, dated Jun. 24, 2020, 9 pages.

(Continued)

*Primary Examiner* — Richard R. Green
*Assistant Examiner* — Madison Elizabeth Dittner
(74) *Attorney, Agent, or Firm* — Hanley, Flight & Zimmerman, LLC

(57) ABSTRACT

Foldable aircraft wings are disclosed. An example aircraft includes a foldable wing having a fixed wing portion, a foldable wing portion and a hinge to pivotally couple the foldable wing portion relative to the fixed wing portion. The hinge includes a wing transition portion including wing hinge ribs and wing stub ribs, respective ones of the wing hinge ribs coupled to corresponding respective ones of the wing stub ribs. The hinge also includes a tip transition portion including tip hinge ribs, where respective ends of the tip hinge ribs positioned between corresponding respective ones of the wing hinge ribs and the wing stub ribs.

15 Claims, 11 Drawing Sheets

(56) References Cited

U.S. PATENT DOCUMENTS

| | | |
|---|---|---|
| 5,201,479 A | 4/1993 | Renzelmann |
| 5,350,135 A | 9/1994 | Renzelmann et al. |
| 5,372,336 A | 12/1994 | Paez |
| 5,381,986 A | 1/1995 | Smith et al. |
| 5,452,643 A | 9/1995 | Smith et al. |
| 8,490,925 B2 | 7/2013 | Buescher et al. |
| 8,946,607 B2 | 2/2015 | Gettinger |
| 9,047,771 B1 | 6/2015 | Thoreen et al. |
| 9,211,946 B2 * | 12/2015 | Good ........................ B64C 3/56 |
| 9,296,469 B2 | 3/2016 | Santini et al. |
| 9,296,472 B2 | 3/2016 | Thoreen et al. |
| 9,481,446 B2 | 11/2016 | Lassen et al. |
| 9,499,252 B2 | 11/2016 | Lassen et al. |
| 9,533,758 B2 | 1/2017 | Gettinger |
| 9,580,166 B2 | 2/2017 | Good et al. |
| 9,610,618 B2 * | 4/2017 | Gaw ........................ B08B 6/00 |
| 9,701,392 B2 * | 7/2017 | Whitlock .................. B64C 3/26 |
| 9,783,284 B2 | 10/2017 | Townsend et al. |
| 9,873,502 B2 | 1/2018 | Good et al. |
| 9,889,920 B2 | 2/2018 | Harding et al. |
| 9,908,612 B2 | 3/2018 | Fox |
| 9,914,524 B2 | 3/2018 | Good et al. |
| 9,919,809 B2 | 3/2018 | Moy et al. |
| 9,950,780 B2 | 4/2018 | Santini et al. |
| 9,950,810 B2 | 4/2018 | Thoreen et al. |
| 9,957,831 B2 | 5/2018 | Soman et al. |
| 10,370,084 B2 | 8/2019 | Cline et al. |
| 10,392,101 B2 | 8/2019 | Axford et al. |
| 10,583,909 B2 | 3/2020 | Alexander et al. |
| 11,077,932 B2 * | 8/2021 | Brakes ................. B64C 23/072 |
| 2009/0283639 A1 | 11/2009 | Ackermann et al. |
| 2011/0089292 A1 | 4/2011 | Williams et al. |
| 2013/0292508 A1 | 11/2013 | Fox |
| 2014/0319268 A1 | 10/2014 | Lassen et al. |
| 2015/0360770 A1 | 12/2015 | Good |
| 2016/0137285 A1 | 5/2016 | Good et al. |
| 2016/0167092 A1 | 6/2016 | Gaw |
| 2016/0251073 A1 | 9/2016 | Good et al. |
| 2016/0362171 A1 | 12/2016 | Lassen et al. |
| 2017/0152017 A1 | 6/2017 | Good et al. |
| 2017/0174314 A1 | 6/2017 | Diamante |
| 2017/0321804 A1 | 11/2017 | Soman et al. |
| 2018/0120525 A1 | 4/2018 | Good et al. |
| 2018/0148159 A1 | 5/2018 | Good et al. |
| 2018/0170516 A1 | 6/2018 | Niemiec et al. |
| 2022/0024559 A1 * | 1/2022 | Horwood ................ B64C 3/187 |

FOREIGN PATENT DOCUMENTS

| | | |
|---|---|---|
| EP | 3263446 | 1/2018 |
| EP | 3575204 | 4/2019 |
| EP | 3689738 | 5/2020 |

OTHER PUBLICATIONS

European Patent Office, "Communication pursuant to Article 94(3) EPC" issued in connection with European Patent Application No. 19 218 619.5, dated Jun. 25, 2021, 5 pages.

European Patent Office "Communication Pursuant to ARticle 94(3) EPC", issued in connection with European Patent Application No. 20170853.4-1010 dated Sep. 23, 2021. 7 pages.

Wikipedia, 'Boeing 777X' Publicshed on Mar. 20, 2019, 15 pages.

European Patent Office, "European Search Report", issued in connection with European Patent Application No. 20170853,4-1010 dated Sep. 28, 2020. 14 pages.

United States Patent and Trademark Office, "Non-Final Office Action" issued in connection with U.S. Appl. No. 16/680,037 dated Feb. 7, 2022, 14 pages.

Ishimitsu et. al., Design and Analysis of Winglets for Military Aircraft, 1976, Boeing Commercial Airplane Company, p. 50 (Year: 1976).

Dussart et. al., In-flight folding wingtip system: inspiration from the XB-70 Valkyrie, Jan. 2019, AIAA Sci Tech Forum, p. 13 (Year: 2019).

\* cited by examiner

FOLDABLE AIRCRAFT WINGS

CROSS REFERENCE TO RELATED APPLICATION

This patent claims the benefit of U.S. Provisional Application No. 62/800,176, filed on Feb. 1, 2019, entitled "Foldable Aircraft Wings." U.S. Provisional Patent Application Ser. No. 62/800,176 is incorporated herein by reference in its entirety.

FIELD OF THE DISCLOSURE

This disclosure relates generally to aircraft wings and, more specifically, to foldable aircraft wings.

BACKGROUND

Long span wings are desirable for commercial aircraft because such wings are more aerodynamically efficient relative to wings having a shorter span. Greater aerodynamic efficiency reduces fuel consumption, which reduces operating costs. The wingspan of an aircraft may be constrained based on dimensional limits and/or regulations imposed by the International Civil Aviation Organization (ICAO), and/or based on physical infrastructure limitations of airports (e.g., the relative sizes of runways, taxiways, gate areas, hangars, etc.).

BRIEF DESCRIPTION OF THE DRAWINGS

Certain examples are shown in the above-identified figures and described in detail below. In describing these examples, like or identical reference numbers are used to identify the same or similar elements.

DETAILED DESCRIPTION

Foldable wing designs may be used to reduce the wingspan of an aircraft when the aircraft is not in flight (e.g., when the aircraft is taxiing, parked, and/or stored). Such designs commonly include a foldable outboard section (e.g., a foldable wing tip) of the wing that is hinged and/or rotatably coupled to a fixed inboard section (e.g., a fixed structure or frame) of the wing. The hinged and/or rotatable coupling enables movement of the foldable outboard section relative to the fixed inboard section between an unfolded position (e.g., a deployed or flight position) and a folded position (e.g., a stowed position). The foldable outboard section may be moved from the folded position to the unfolded position prior to takeoff of the aircraft to increase the wingspan of the aircraft. The foldable outboard section may conversely be moved from the unfolded position to the folded position subsequent to landing of the aircraft to decrease the wingspan of the aircraft.

In some examples, a foldable wing for an aircraft includes a fixed wing portion having wing hinge ribs and wing stub ribs, where respective ones of the wing hinge ribs are coupled to corresponding respective ones of the wing stub ribs. In some such examples, the foldable wing includes a foldable wing portion having tip hinge ribs, where respective ends of the tip hinge ribs are positioned between corresponding respective ones of the wing hinge ribs and the wing stub ribs. A hinge is to pivotally couple the foldable wing portion relative to the fixed wing portion. In some examples, at least a portion of the hinge provides a double-shear reaction. In some examples, the portion of the hinge that is to provide the double-shear reaction includes a latch interface. In some examples, the hinge includes one or more hinge pins to pass through openings formed in respective ones of the wing hinge ribs and the tip hinge ribs. In some examples, the foldable wing includes a latch. In some such examples, the latch is movable between a latched position to prevent pivotal movement of the foldable wing portion and the fixed wing portion about the hinge and an unlatched position to enable pivotal movement of the foldable wing portion relative to the fixed wing portion about the hinge.

Figure 1:
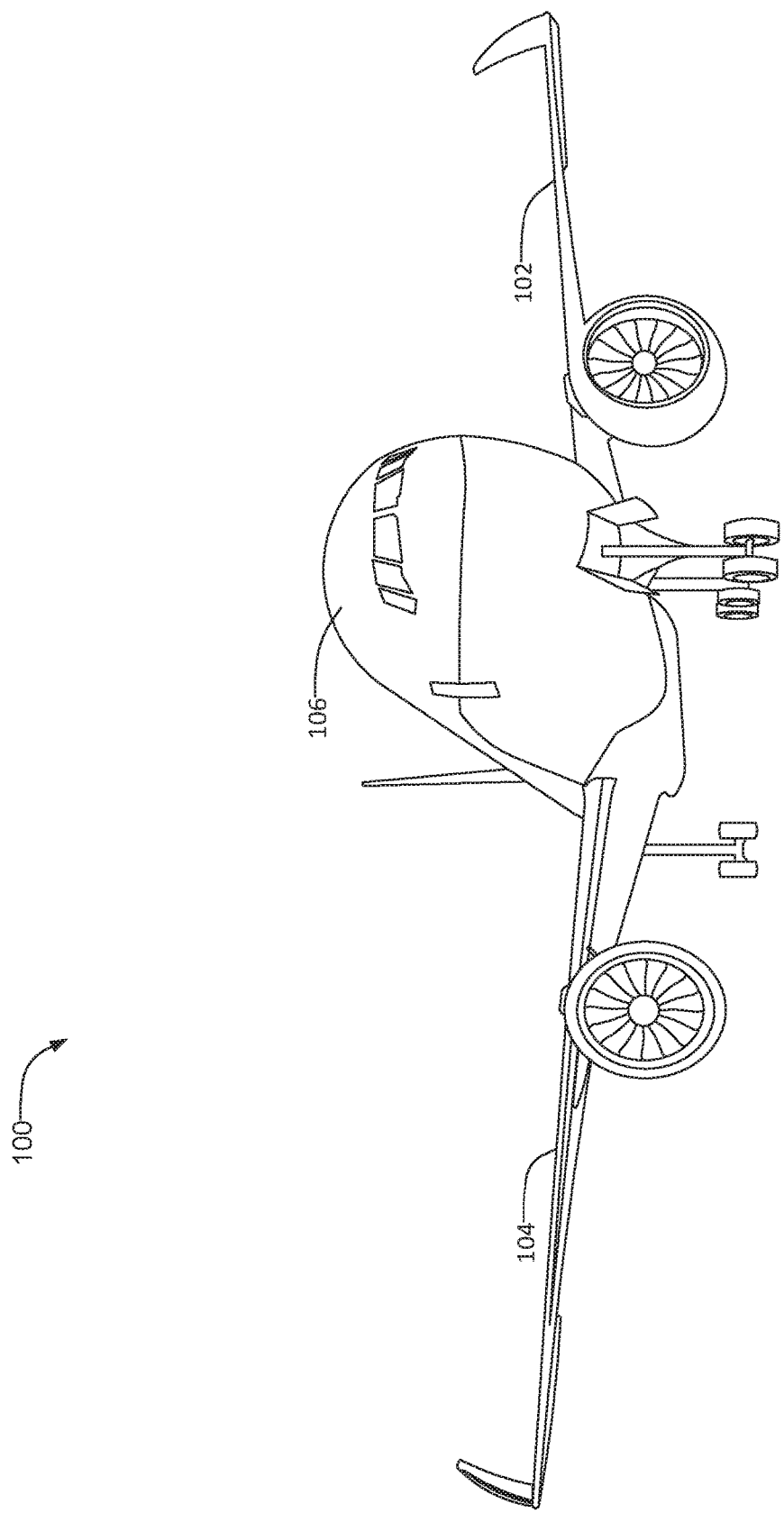
FIG. 1 is a perspective view of an example aircraft having example foldable wings constructed in accordance with teachings of this disclosure.

FIG. 1 is a perspective view of an aircraft 100 having foldable wings 102, 104 constructed in accordance with teachings of this disclosure. The foldable wings 102, 104 extend from a fuselage 106. The foldable wing 102 is identical in structure and function to the foldable wing 104. Therefore, only the foldable wing 102 will be discussed in detail for simplicity and brevity. The aircraft 100 of the illustrated example is a commercial aircraft. In some examples, the foldable wings 102, 104 disclosed herein can be implemented with any other example aircraft such as, for example, military aircraft, transport aircraft and/or any other suitable aircraft.

Figure 2:
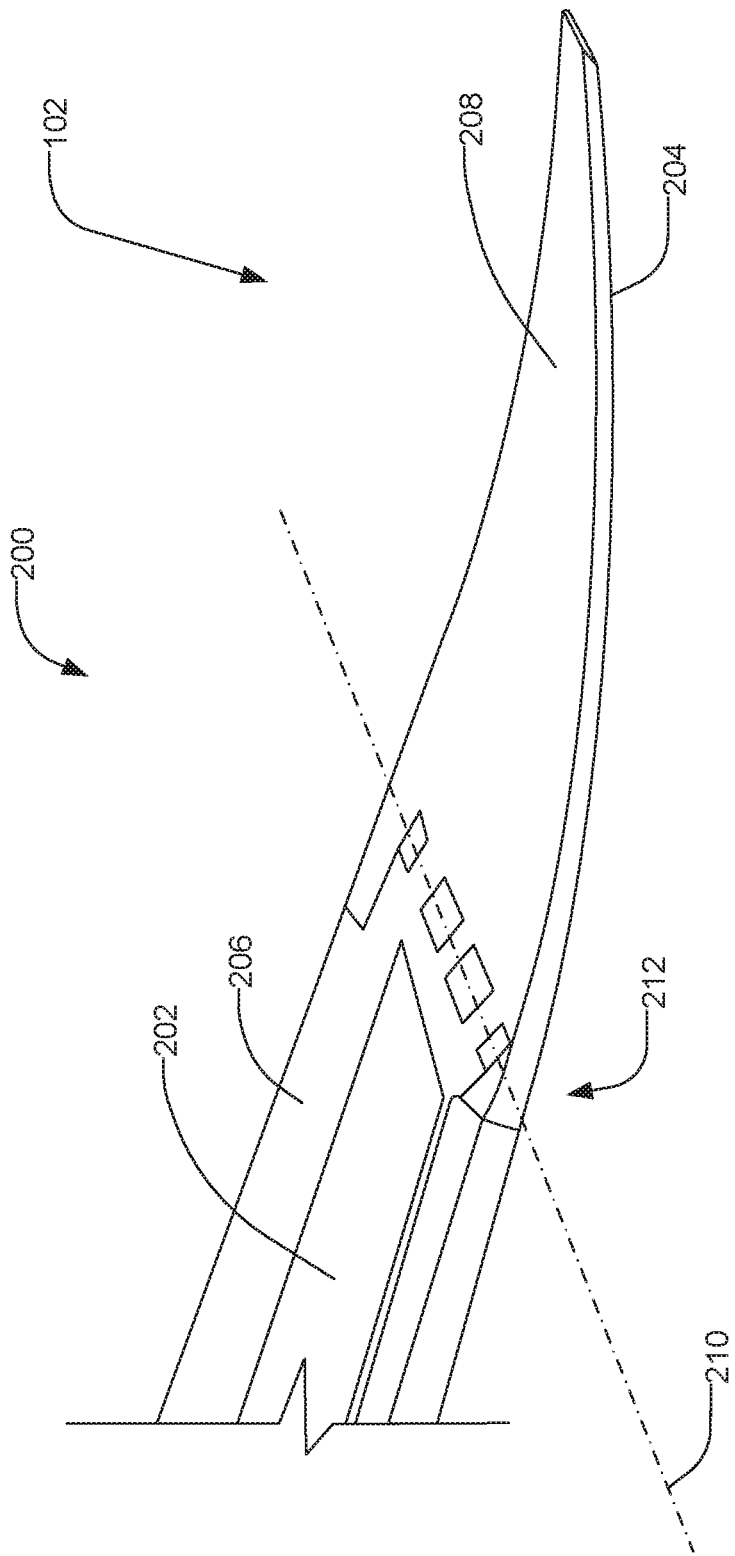
FIG. 2 is a perspective view of the example foldable wing of FIG. 1 shown in an example unfolded position.

FIG. 2 is a perspective view of the foldable wing 102 of FIG. 1 shown in an example unfolded position 200 (e.g., a deployed position, an extended position or a flight position). The foldable wing 102 includes a fixed wing portion 202 and a foldable wing tip 204. The foldable wing tip 204 is a foldable outboard section of the foldable wing 102. The fixed wing portion 202 is a fixed inboard section of the foldable wing 102. The fixed wing portion 202 of the foldable wing 102 is fixedly and/or rigidly coupled (e.g., directly or indirectly) to the fuselage 106 of the aircraft 100. In some examples, the foldable wing tip 204 is parallel relative to the fixed wing portion 202 when the foldable wing tip 204 is in the unfolded position 200 of FIG. 2. For example, the foldable wing tip 204 is an extension of the fixed wing portion 202 when the foldable wing tip 204 is in the unfolded position 200. In some examples, an upper surface 206 of the fixed wing portion 202 forms a continuous surface relative to an upper surface 208 of the foldable wing tip 204. In the unfolded position 200, the foldable wing tip 204 is part of an aerodynamic surface of the fixed wing portion 202 that generates lift during flight. The foldable wing tip 204 of the foldable wing 102 is rotatable and/or foldable relative to the fixed wing portion 202 of the foldable wing 102. Rotation and/or folding of the foldable wing tip 204 relative to the fixed wing portion 202 occurs about an example hinge line or hinge axis 210 defined by a hinge interface 212.

Figure 3:
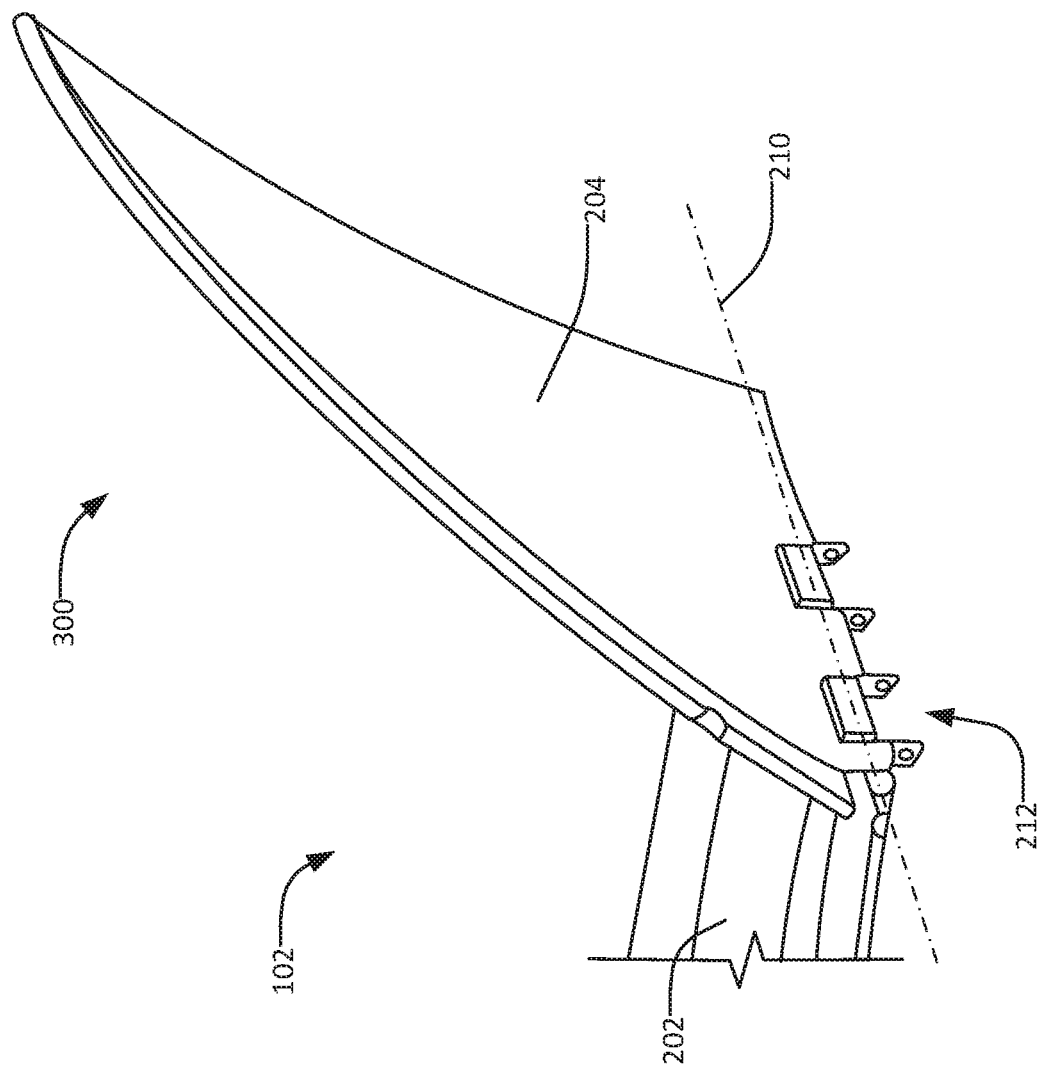
FIG. 3 is a perspective view of the example foldable wing of FIGS. 1 and 2 shown in an example unfolded position.

FIG. 3 is a perspective view of the foldable wing 102 of FIGS. 1 and 2 shown in an example folded position 300. In some examples, the foldable wing tip 204 is positioned at an angle relative to the fixed wing portion 202 when the foldable wing tip 204 is in the folded position 300 of FIG. 3. In the illustrated example of FIG. 3, the foldable wing tip 204 is positioned at an angle of approximately eighty-five degrees relative to the position of the fixed wing portion 202. In other examples, the angle between the foldable wing tip 204 and the fixed wing portion 202 may be less than or greater than eighty-five degrees (e.g., ninety degrees, forty-five degrees, one hundred thirty-five degrees, etc.) when the foldable wing tip 204 is in the folded position 300.

Figure 4:
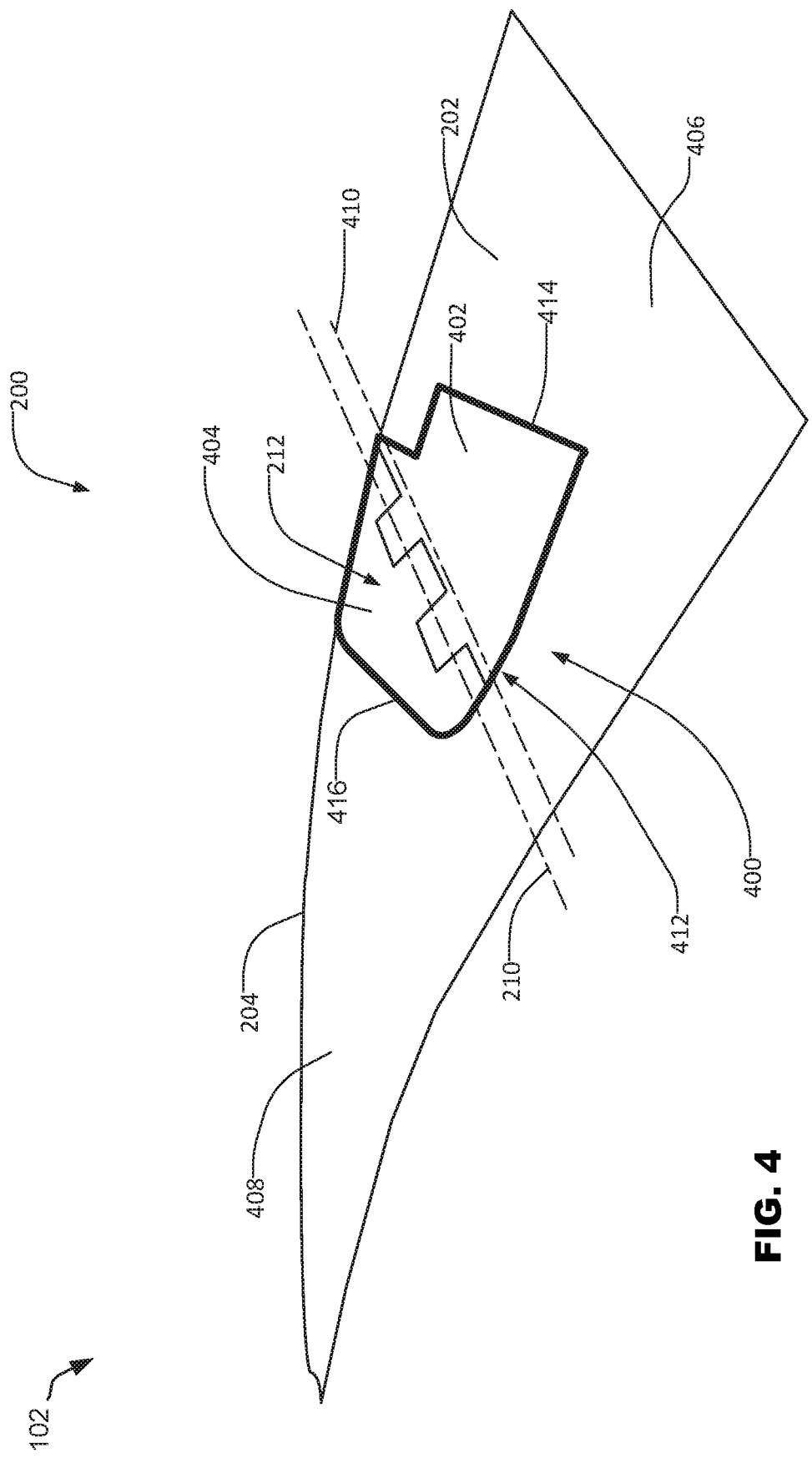
FIG. 4 is a perspective view of the example foldable wing of FIGS. 1-3 shown in the example unfolded position and without skins.

FIG. 4 is a perspective view of the foldable wing 102 of FIGS. 1-3 shown in the unfolded position 200. To define the hinge interface 212, the foldable wing 102 of the illustrated example includes a hinge 400. Specifically, the hinge 400 of the illustrated example defines the hinge interface 212 that enables pivotal attachment of the foldable wing tip 204 relative to the fixed wing portion 202. The hinge 400 of the illustrated example includes a first (e.g., wing) transition portion 402 and a second (e.g., tip) transition portion 404. The wing transition portion 402 of the illustrated example attaches (e.g., extends) to a wing box 406 of the fixed wing portion 202 and the tip transition portion 404 of the illustrated example attaches (e.g., extends) to a tip box 408 of the foldable wing tip 204. Additionally, the hinge 400 of the illustrated example locks or prevents pivotal movement of the foldable wing tip 204 relative to the fixed wing portion 202 along a latch axis 410 of a latch interface 412. The latch axis 410 of the illustrated example is offset (e.g., laterally offset) relative to the hinge axis 210. For example, the hinge axis 210 is positioned outboard relative to the latch axis 410. For example, the latch axis 410 is positioned closer to the wing box 406 than the hinge axis 210. For example, the hinge axis 210 is located between the tip box 408 and the latch axis 410, and the latch axis 410 is located between the wing box 406 and the hinge axis 210. In some examples, the hinge axis 210 is parallel relative to the latch axis 410. In some examples, the hinge axis 210 and/or the latch axis 410 are parallel relative to a lateral outboard edge of the wing transition portion 402 and/or the tip transition portion 404. In some examples, the hinge axis 210 and the latch axis 410 are parallel relative to a fore and aft direction of the aircraft 100 (e.g., a direction of flight). In some examples, the hinge axis 210 and the latch axis 410 are parallel relative to an edge 414 (e.g., an inboard edge or wing rib) of the wing transition portion 402 or an edge 416 (e.g., an outboard edge or wing rib) of the tip transition portion 404. In some examples, the hinge axis 210 and/or the latch axis 410 can have any other angle and/or orientation relative to the fore-aft direction. In some examples, the hinge axis 210 is not parallel relative to the latch axis 410.

As described in greater detail below, the hinge 400 transfers or distributes loads from the foldable wing tip 204 (e.g., the tip box 408) to the fixed wing portion 202 (e.g., the wing box 406). Additionally, at least a portion of the hinge 400 of the illustrated example provides a double-shear reaction. For example, the hinge 400 of the illustrated example provides a single-shear reaction load along the hinge interface 212 and provides a double-shear reaction load along the latch interface 412. Thus, the portion of the hinge 400 that is to provide the double-shear reaction includes the latch interface 412.

Figure 5:
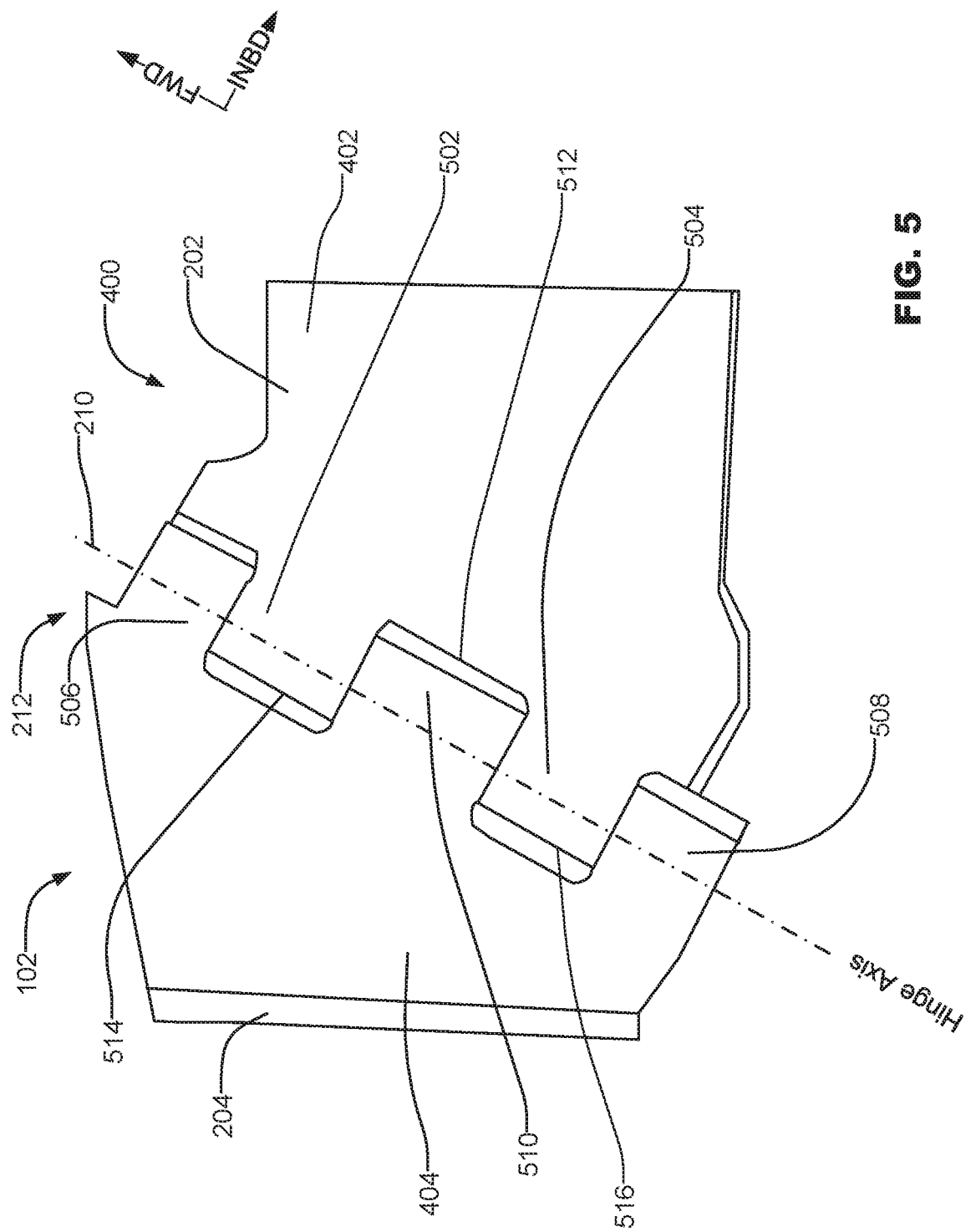
FIG. 5 is a top view of an example hinge of the example foldable wing of FIGS. 1-4.

FIG. 5 is a top view of the hinge 400 of the example foldable wing of FIGS. 1-4. As noted above, the hinge 400 of the illustrated example couples the foldable wing tip 204 (FIG. 2) and the fixed wing portion 202 (FIG. 2). The wing transition portion 402 of the illustrated example defines a first wing hinge portion 502 and a second wing hinge portion 504 of the hinge interface 212. The tip transition portion 404 defines a first tip hinge portion 506, a second tip hinge portion 508, and a third tip hinge portion 510 of the hinge interface 212. The third tip hinge portion 510 of the illustrated example is positioned between the first tip hinge portion 506 and the second tip hinge portion 508.

When the tip transition portion 404 is coupled to the wing transition portion 402, the first and second wing hinge portions 502, 504 are interleaved with the tip hinge portions 506-510. For example, at least a portion of the first wing hinge portion 502 and/or at least a portion of the second wing hinge portion 504 of the fixed wing portion 202 extend into the foldable wing tip 204, and at least a portion of the tip hinge portions 506-510 extend into the fixed wing portion 202. To this end, the interleaved configuration does not increase an outer mold line (OML) of the foldable wing 102. For example, the foldable wing 102 of the illustrated example has a relatively smooth transition between the fixed wing portion 202 and the foldable wing tip 204. In other words, the hinge 400 of the illustrated example does not interfere or affect aerodynamic characteristic(s) or performance of the foldable wing 102. In some examples, approximately between 10% and 100% of the first and second wing hinge portions 502, 504 extend in the foldable wing tip 204. In some examples, approximately between 10% and 100% of the tip hinge portions 506-510 extend in the fixed wing portion 202. In some examples, each of the first and second wing hinge portions 502, 504 include a width (e.g., in a fore-aft direction) and/or length (e.g., in an inboard-outboard direction) that is different than a width (e.g., in the fore-aft direction) and/or a length (e.g., in an inboard-outboard direction) of respective ones of the tip hinge portions 506-510. In some examples, each of the first and second wing hinge portions 502, 504 include a width (e.g., in a fore-aft direction) and/or length (e.g., in an inboard-outboard direction) that is identical to a width (e.g., in a fore-aft direction) and/or length (e.g., in an inboard-outboard direction) of respective ones of the tip hinge portions 506-510.

The first wing hinge portion 502 is spaced from the second wing hinge portion 504 to define a space or first opening 512 therebetween to receive the third tip hinge portion 510. The first tip hinge portion 506 is spaced from the third tip hinge portion 510 to define a space or first opening 514 therebetween to receive the first wing hinge portion 502. The second tip hinge portion 508 is spaced from the third tip hinge portion 510 to define a space or second opening 516 therebetween to receive the second wing hinge portion 504. Thus, the first wing hinge portion 502 is positioned between the first tip hinge portion 506 and the third tip hinge portion 510, and the second wing hinge portion 504 is positioned between the second tip hinge portion 508 and the third tip hinge portion 510. As noted above and described in greater detail below, the hinge interface 212 of the illustrated example transfers loads form the foldable wing tip 204 to the fixed wing portion 202 when the foldable wing tip 204 is in the unfolded position 200, the folded position 300, during flight, etc. In some examples, the wing transition portion 402 can include any number of wing hinge portions (e.g., more than or less than the first and second wing hinge portions 502, 504) and/or the tip transition portion 404 can include any number of tip hinge portions (e.g., more than or less than the tip hinge portions 506-510). In some examples, the hinge interface 212 configuration can be mirrored such that the wing transition portion 402 includes three wing hinge portions and the tip transition portion 404 includes two tip hinge portions. In some examples, the wing transition portion 402 includes only the first wing hinge portion 502 and the tip transition portion includes only the first tip hinge portion 506 and the third tip hinge portion 510. In some examples, the wing transition portion 402 includes the first wing hinge portion 502 and the second wing hinge portion 504 and the tip transition portion 404 includes only the third tip hinge portion 510. In some examples, the wing transition portion includes any number of wing hinge portions and the tip transition portion includes any number of tip hinge portions.

Figure 6:
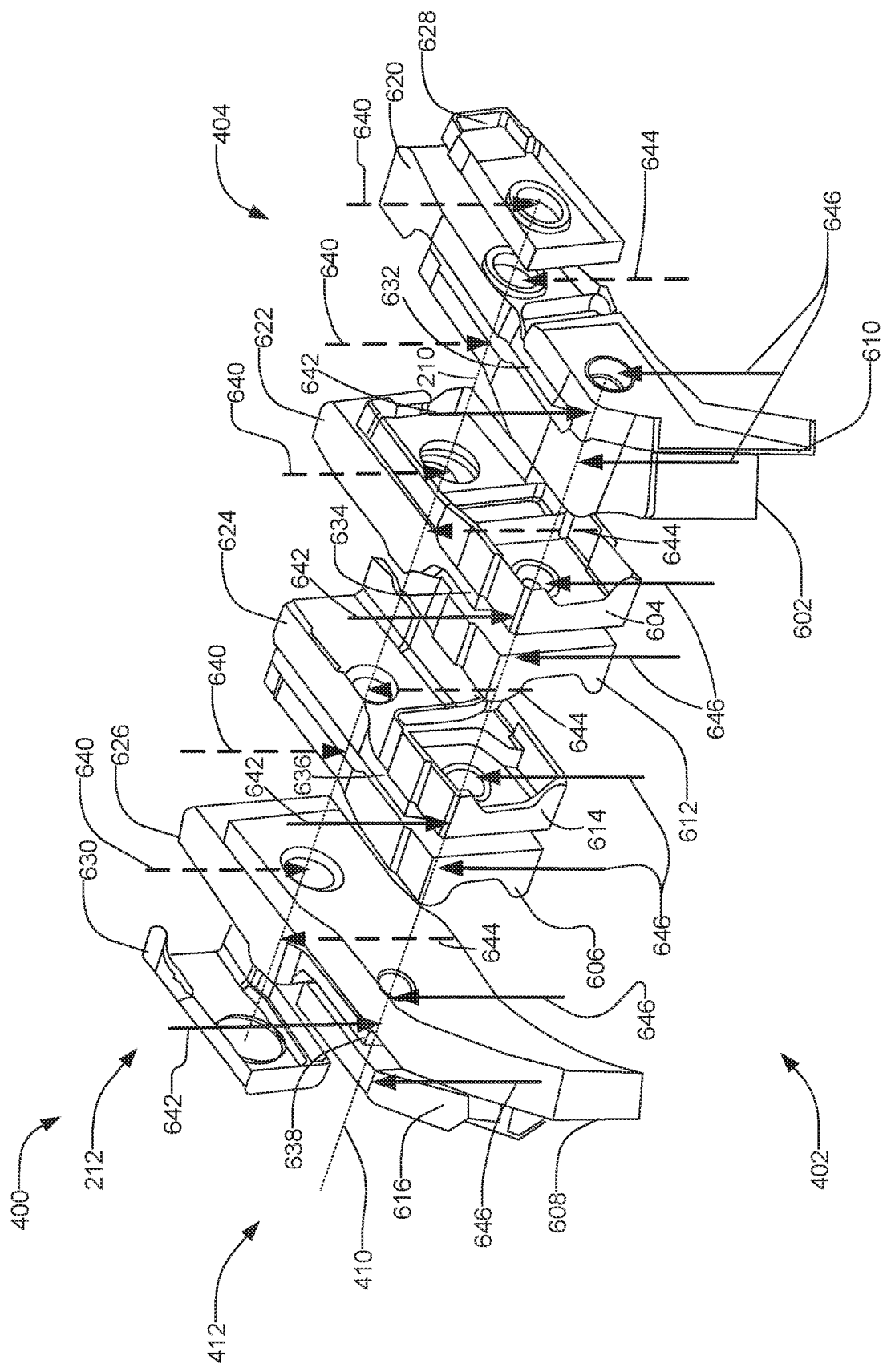
FIG. 6 is a partial, perspective view of the example structure of FIGS. 1-5.

FIG. 6 is a partial, perspective view of the hinge 400 of FIGS. 1-5, looking outboard toward the tip. The wing transition portion 402 of the illustrated example includes a first wing hinge rib 602, a second wing hinge rib 604, a third wing hinge rib 606, a fourth wing hinge rib 608, a first stub rib 610, a second stub rib 612, a third stub rib 614 and a fourth stub rib 616. For example, the first wing hinge portion 502 (FIG. 5) of the illustrated example includes the first wing hinge rib 602 and the second wing hinge rib 604. The first wing hinge rib 602 is spaced from the second wing hinge rib 604. The second wing hinge portion 504 (FIG. 5) of the illustrated example includes the third wing hinge rib 606 and the fourth wing hinge rib 608. The third wing hinge rib 606 is spaced from the fourth wing hinge rib 608. As noted above, the wing transition portion 402 couples to the fixed wing box 406 (FIG. 4). To couple to the fixed wing box 406, the first wing hinge rib 602 attaches to (e.g., abuts) a front wing spar of the wing box 406 and the fourth wing hinge rib 608 attaches to (e.g., abuts) a rear wing spar of the wing box 406.

The tip transition portion 404 of the illustrated example includes a first tip hinge rib 620, a second tip hinge rib 622, a third tip hinge rib 624, and a fourth tip hinge rib 626. Additionally, the tip transition portion 404 of the illustrated example includes a fifth tip hinge rib 628 adjacent the first tip hinge rib 620, and a sixth tip hinge rib 630 adjacent the fourth tip hinge rib 626. The first tip hinge portion 506 (FIG. 5) includes the first tip hinge rib 620 and the fifth tip hinge rib 628. The second tip hinge portion 508 (FIG. 5) includes the fourth tip hinge rib 626 and the sixth tip hinge rib 630. The third tip hinge portion 510 (FIG. 5) includes the second and third tip hinge ribs 622, 624. To couple the tip transition portion 404 and the tip box 408 (FIG. 4), the first tip hinge rib 620 attaches (e.g., abuts) to a front spar of the tip box 408 and the fourth tip hinge rib 626 attaches to (e.g., abuts) a rear spar of the tip box 408.

FIG. 6 illustrates wing hinge ribs 602-608 and wing stub ribs 610-616 relative to tip hinge ribs 620-630. For example, along the latch axis 410, at least a portion 632 (e.g., an end) of the first tip hinge rib 620 is positioned between the first wing hinge rib 602 and the first stub rib 610, at least a portion 634 (e.g., an end) of the second tip hinge rib 622 is positioned between the second wing hinge rib 604 and the second stub rib 612, at least a portion 636 (e.g., an end) of the third tip hinge rib 624 is positioned between the third wing hinge rib 606 and the third stub rib 614, and at least a portion 638 (e.g., an end) of the fourth tip hinge rib 626 is positioned between the fourth wing hinge rib 608 and the fourth stub rib 616.

FIG. 6 also includes a schematic illustration of shear loads 640 along the hinge interface 212 and shear loads 642 along the latch interface 412. Specifically, the hinge interface 212 and the latch interface 412 are subjected to single-shear loading. The wing hinge ribs 602-608 and the tip hinge ribs 620-626 provide hinge pin reaction loads 644 along the hinge interface 212 to react the shear loads 640. The hinge pin reaction loads 644 (e.g., load vectors) are represented in FIG. 6 as dashed arrow lines. The wing hinge ribs 602-608 and the wing stub ribs 610-616 provide latch pin reaction loads 646 along the latch interface 412. The latch pin reaction loads 646 (e.g., load vectors) are represented in FIG. 6 in solid arrow lines. Based on the configuration of the wing hinge ribs 602-608, the wing stub ribs 610-616, and the tip hinge ribs 620-630, the hinge pin reaction loads 644 at the hinge interface 212 are single-shear reaction loads and the latch pin reaction loads 646 at the latch interface 412 are double-shear reaction loads. For example, the wing hinge ribs 602-608 in conjunction with the corresponding wing stub ribs 610-616 provide a double-shear load path for the latch pins 802 (FIG. 8).

Figure 7:
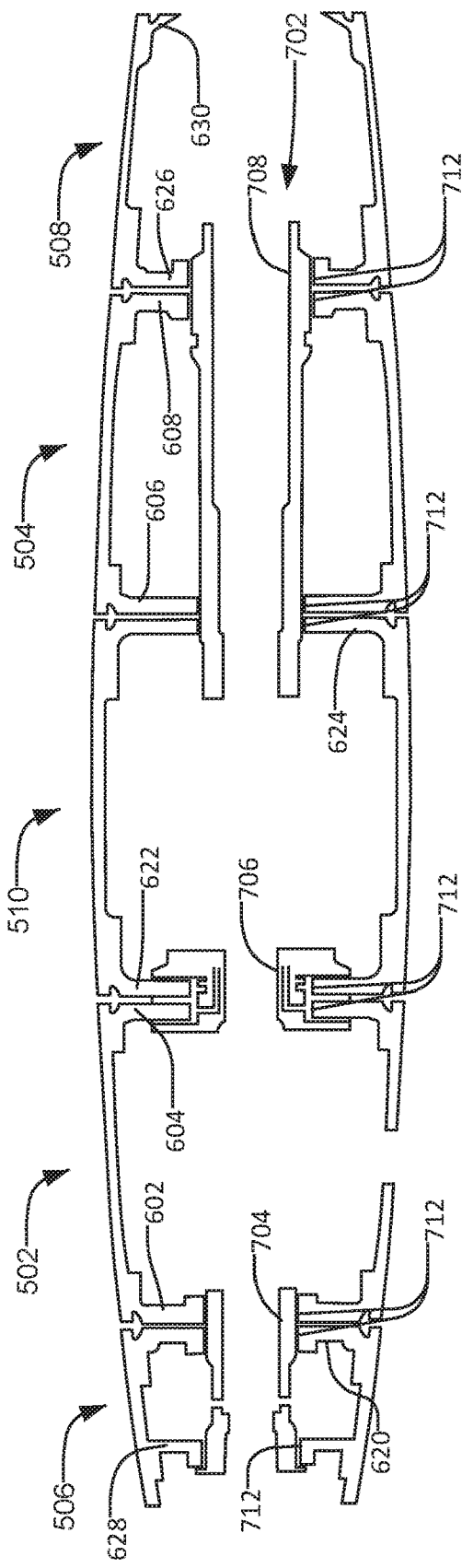
FIG. 7 is a cross-sectional view of the example hinge taken along hinge axis 210 of FIG. 4.

FIG. 7 is a cross-sectional view of the hinge 400 taken along line 7-7 of FIG. 4 looking inboard toward a wing root of the fixed wing portion 202. Specifically, the cross-section of FIG. 7 is taken along the hinge axis 210 of the hinge 400. As noted above, when the wing transition portion 402 is coupled to the tip transition portion 404, the first wing hinge portion 502 is positioned or located between the first tip hinge portion 506 and the third tip hinge portion 510, and the second wing hinge portion 504 is positioned between the second tip hinge portion 508 and the third tip hinge portion 510. The wing hinge ribs 602-608 and the tip hinge ribs 620-630 support and/or receive a hinge pin assembly 702. The hinge pin assembly 702 of the illustrated example includes a first hinge pin 704, a second hinge pin 706, and a third hinge pin 708. For example, each of the wing hinge ribs 602-608 and the tip hinge ribs 620-630 include hinge apertures 712 to receive the hinge pin assembly 702. For example, the hinge apertures 712 of the first wing hinge rib 602, the first tip hinge rib 620 and the fifth tip hinge rib 628 receive or support the first hinge pin 704. The hinge apertures 712 of the second wing hinge rib 604 and the second tip hinge rib 622 receive or support the second hinge pin 706. The hinge apertures 712 of the third wing hinge rib 606, the fourth wing hinge rib 608, the third tip hinge rib 624, and the fourth tip hinge rib 626 receive the third hinge pin 708. The third hinge pin 708 extends between the third and fourth wing hinge ribs 606, 608 and the third and fourth tip hinge ribs 624, 626. In some examples, the hinge pin assembly 702 can include a unitary hinge pin that extends through or is otherwise supported by the hinge apertures 712 of the wing hinge ribs 602-608 and the tip hinge ribs 620-630. In some examples, the hinge pin assembly 702 includes two hinge pins or any other number of hinge pins (e.g., 3, 4, 5, 6, etc.).

Figure 8:
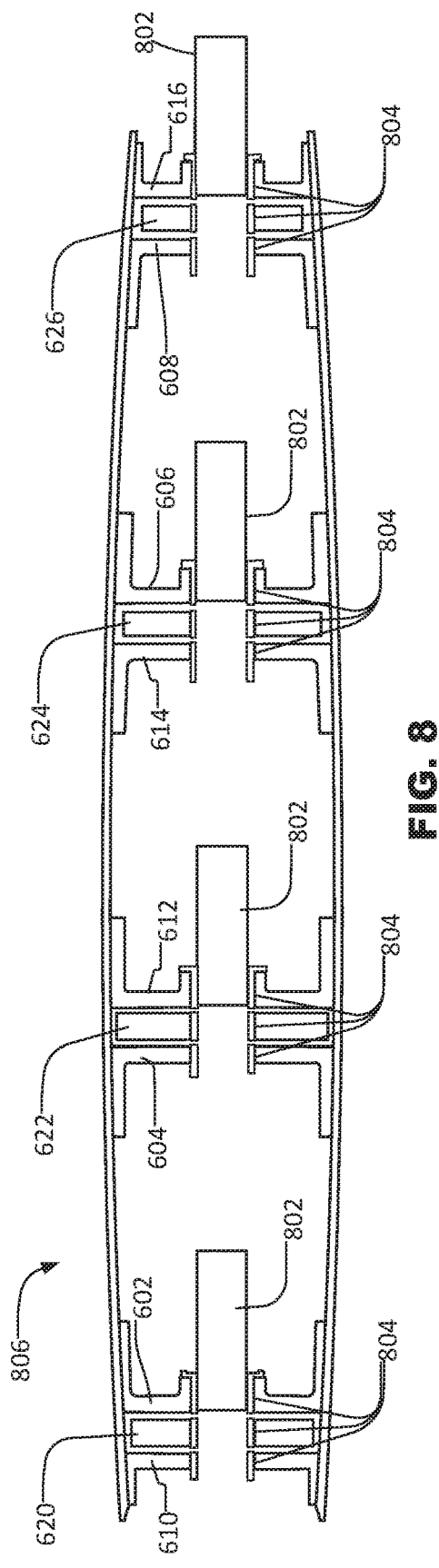
FIG. 8 is a cross-sectional view of the example hinge taken along latch axis 410 of FIG. 4.

FIG. 8 is a cross-sectional view of the hinge 400 taken along line 8-8 of FIG. 4 looking inboard toward the wing root of the fixed wing portion 202. Specifically, the cross-section of FIG. 8 is taken along the latch axis 410 of the hinge 400. To prevent rotation (e.g., lock rotation) of the foldable wing tip 204 relative to the fixed wing portion 202, the wing transition portion 402 of the illustrated example includes a latch system 800. Specifically, the latch system 800 of the illustrated example includes a plurality of latch pins 802. Each of the wing hinge ribs 602-608, the wing stub ribs 610-616, and the tip hinge ribs 620-626 include latch pin apertures 804 that align along the latch axis 410 to receive respective ones of the latch pins 802. In some examples, the latch system 800 can include a unitary hinge pin that extends through or is otherwise supported by the latch pin apertures 804 wing hinge ribs 602-608, the wing stub ribs 610-616, and the tip hinge ribs 620-626. In some examples, the latch system 800 includes two latch pins or any other number of hinge pins (e.g., 3, 4, 5, 6, etc.). In some examples, the latch system 800 includes one latch pin that interfaces with a latch pin aperture formed with one of the wing hinge ribs 602-608 or the wing stub ribs 610-616, and a latch pin aperture formed on one of the tip hinge ribs 620-626.

FIG. 8 illustrates the latch system 800 in an unlatched or unlocked position 806. In the unlocked position 806, the latch pins 802 are removed from the latch pin apertures 804 of the respective tip hinge ribs 620-626 to enable rotation of the foldable wing tip 204 relative to the fixed wing portion 202 about the hinge axis 210.

To prevent rotation of the foldable wing tip 204 relative to the fixed wing portion 202, the latch system 800 is moved to a locked or latched position. For example, in the locked position, the latch pins 802 are moved or positioned (e.g., via latch pin actuators) in the respective latch pin apertures 804. Specifically, in the locked position, the latch pins 802 are positioned within the latch pin apertures 804 of the respective tip hinge ribs 620-626. In the locked position, the foldable wing tip 204 is fixed (e.g., cannot rotate) relative to the fixed wing portion 202 about the hinge axis 210.

Figure 9:
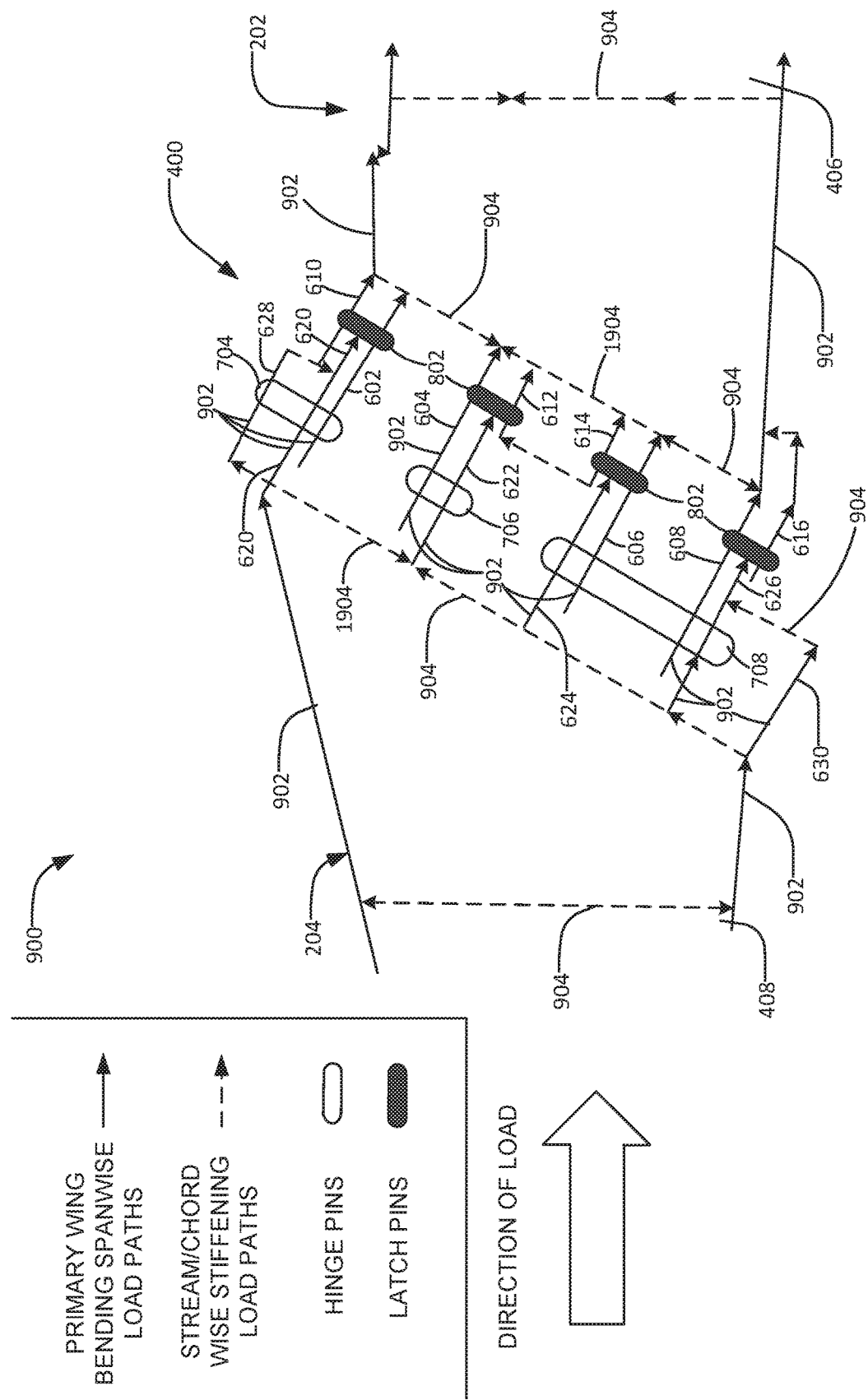
FIG. 9 is the schematic overlay of the example load paths of FIGS. 1-5.

FIG. 9 is a schematic view of the hinge 400 of FIG. 5 including a schematic overlay 900 of load paths of the hinge 400. The hinge pins 704, 706, 708 and the latch pins 802 are schematically illustrated in FIG. 9. The foldable wing 102 of FIG. 9 is in the unfolded position 200 and the latch system 800 is in the latched position 806. The tip transition portion 404 and the wing transition portion 402 couple together to define the hinge interface 212 and the latch interface 412. The hinge 400 provide a primary load path to transfer a load from the foldable wing tip 204 to the fixed wing portion 202. For example, the hinge 400 of the illustrated example utilizes the wing hinge ribs 602-608 and the tip hinge ribs 620-626 to transmit loads across the hinge interface 212. For example, the hinge 400 provide load paths from the tip box 408 to the wing box 406. In some examples, each of the wing hinge ribs 602-608 and the tip hinge ribs 620-626 is capable of transferring the loads across the hinge 400, thereby providing a fail-safe system. In this manner if one of the wing hinge ribs 602-608 and the tip hinge ribs 620-626 becomes damaged (e.g., the first wing hinge rib 602 becomes damaged) and cannot transfer loads, the other ones of the wing hinge ribs 602-608 and the tip hinge ribs 620-626 distribute and transfer the loads to the fixed wing box 406.

Additionally, the hinge 400 of the illustrated example utilizes the hinge pin assembly 702 and the latch system 800 to react load across the hinge interface 212 and the latch interface 412. For example, the mounting orientation (e.g., a horizontal orientation) of the hinge pin assembly 702 enables the hinge pin assembly 702 to react loads across the hinge interface 212. Specifically, the first hinge pin 704 provides a single-shear load path as the first hinge pin 704 is supported by the first wing hinge rib 602 and the first tip hinge rib 620 (e.g., a first rib interface). The second hinge pin 706 provides a single-shear load path as the hinge pin assembly 702 is supported by the second wing hinge rib 604 and the second tip hinge rib 622 (e.g., a second rib interface).

The second hinge pin 706 also reacts axial loads (e.g., in a direction along the hinge axis 210). The third hinge pin 708 provides a double-shear load path as the third hinge pin 708 has a first end supported by the third wing hinge rib 606 and the third tip hinge rib 624 (e.g., a third hinge rib interface), and has a second end opposite the first end supported by the fourth wing hinge rib 608 and the fourth tip hinge rib 626 (e.g., a fourth hinge rib interface).

To this end, the hinge 400 of the illustrated example provides a primary wing bending/spanwise load path and a stream/chord wise stiffening load path. In FIG. 9, lines identified with reference numeral 902 are representative of primary wing bending or spanwise load paths typically provided by ribs or spars of the hinge 400 (e.g., the tip hinge ribs 620-630, the wing hinge ribs 602-608, the wing stub ribs 610-616, etc.). Lines identified with reference numeral 904 are representative of stream/chord wise stiffening load paths typically provided by one or more closeout ribs or spars of the hinge 400. The direction of the shear loads is from the foldable wing tip 204, through the hinge 400, and to the fixed wing portion 202. Additionally, the wing hinge ribs 602-608 and the corresponding wing stub ribs 610-616 provide double-shear load paths for the latch pins and reduce (e.g., minimize) transfer or prying loads into the latch pin actuators that actuate the latch pins 802. In some examples, the latch pin actuators can be positioned adjacent to the ends 634-638 of the tip hinge ribs 620-626.

Figure 10:
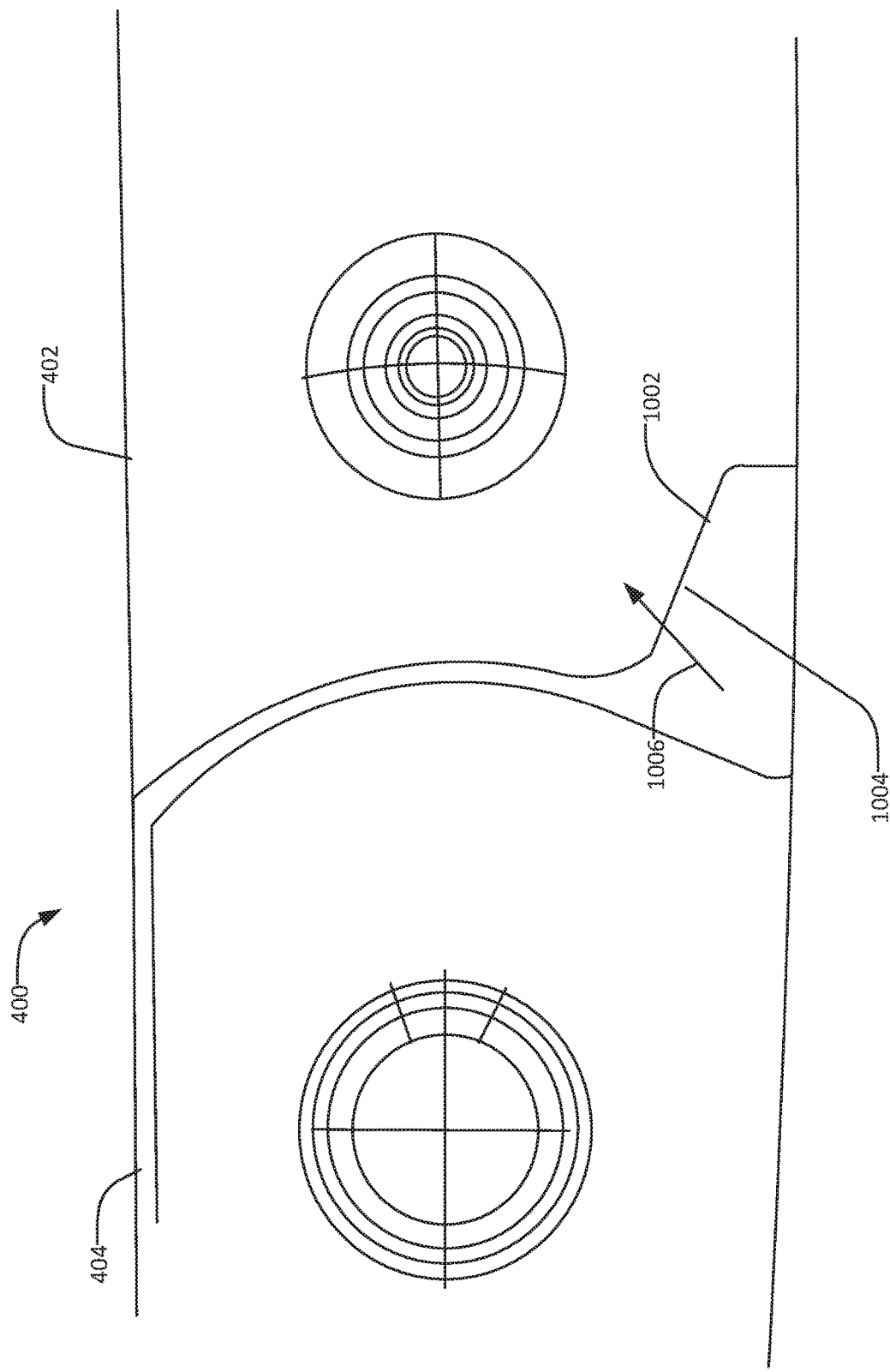
FIG. 10 is a partial, cross-sectional view of the example foldable wing of FIGS. 1-9.

FIG. 10 is a partial, cross-sectional view of the example foldable wing of FIGS. 1-9 looking forward from behind wing 102. To react preloading during latching and/or flight loads during flight, the wing transition portion 402 of the illustrated example includes a stop pad 1002 (e.g., a shoulder, a brace, a bracket, etc.). The stop pad 1002 of the illustrated example is integral with and supported by one of the wing stub ribs 612-616 (e.g. the third stub rib 614). To react preloading during latching and/or loads during flight, the tip transition portion 404 of the illustrated example includes a stop pad 1004 (e.g., a shoulder, a brace, a bracket, etc.). The stop pad 1004 is integral with and supported by one of the tip hinge ribs 620-630 (e.g., the third tip hinge portion 510). As noted above, the first opening 512 of the wing transition portion 402 (FIG. 5) receives the third tip hinge portion 510. The stop pad 1002 interacts with (e.g., directly engage) the stop pad 1004 when the foldable wing tip 204 is in the unfolded position 200. The stop pad 1004 moves away (e.g., disengages or detaches) from the stop pad 1002 when the foldable wing tip 204 is the folded position 300. Specifically, when the foldable wing tip 204 is in the unfolded position 200, engagement between the stop pad 1002 and 1004 provides a load path 1006 to enable transfer of loads from the foldable wing tip 204 to the fixed wing portion 202. In some examples, the wing transition portion 402 can include a plurality of stops that interacts with a plurality of stops of the tip transition portion 404.

Figure 11:
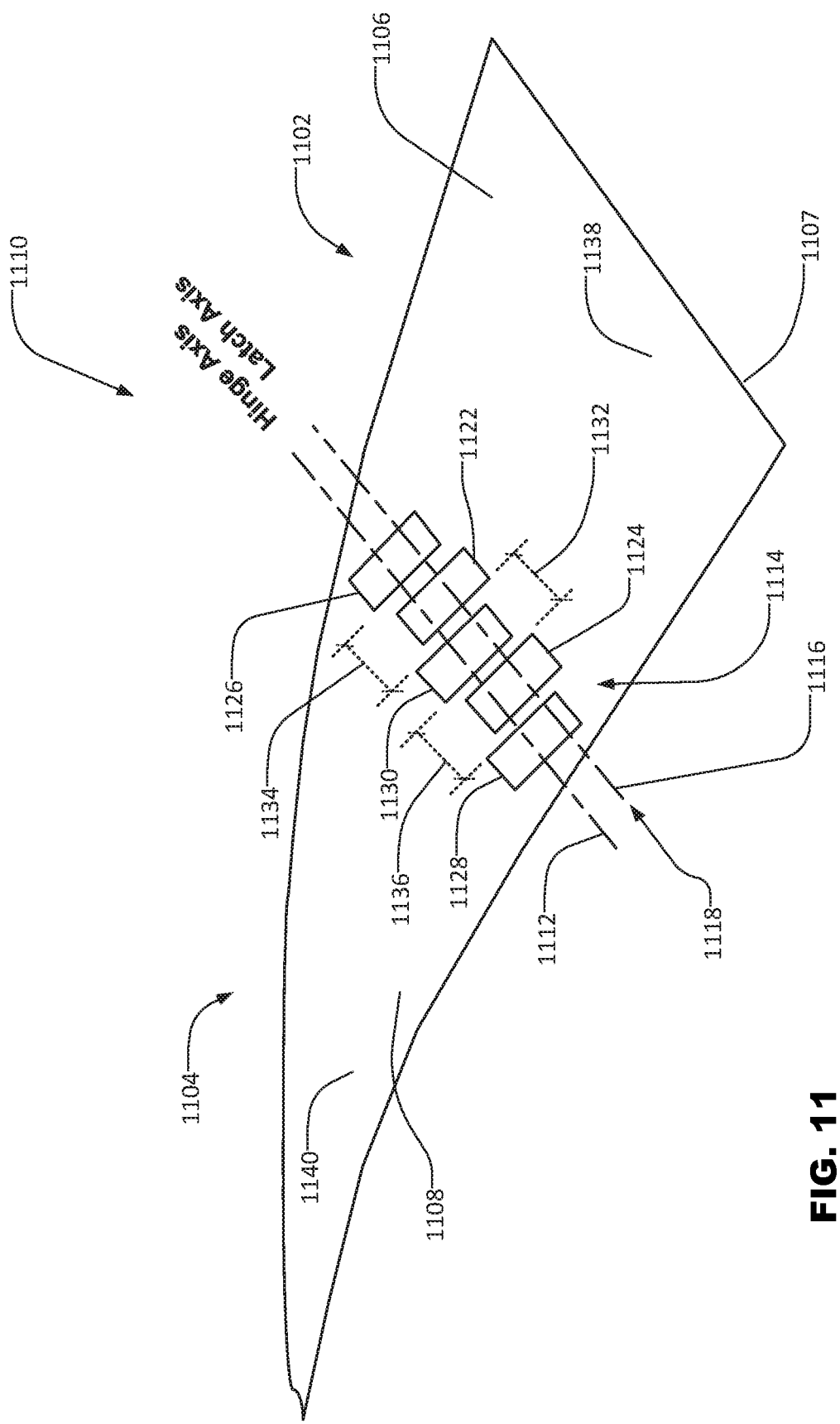
FIG. 11 is a perspective view of another example foldable wing disclosed herein.

FIG. 11 is a perspective view of another example foldable wing 1100 disclosed herein. Many of the components of the foldable wing 1100 of FIG. 11 are substantially similar or identical to the components of the foldable wing 102 described above in connection with FIGS. 1-10. As such, those components will not be described in detail again below. Instead, the interested reader is referred to the above corresponding descriptions for a complete written description of the structure and operation of such components. To facilitate this process, identical reference numbers will be used for structures in FIG. 11 that correspond to structures in FIG. 1-10.

The foldable wing 1100 includes a fixed wing portion 1102 and a foldable wing tip 1104. The fixed wing portion 1102 of the foldable wing 1100 is a wing box 1106 to fixedly and/or rigidly coupled (e.g., directly or indirectly) to a fuselage (e.g., a fuselage 106) of an aircraft (e.g., the aircraft 100). The foldable wing tip 1104 is a tip box 1108 and is a foldable outboard section of the foldable wing 1100. Unlike the foldable wing 102 of FIGS. 1-10, the foldable wing 1100 does not include the wing transition portion 402 and the tip transition portion 404. In contrast, the wing box 1106 and the tip box 1108 define a hinge interface 1110 to enable the foldable wing tip 1104 to rotate and/or fold relative to the fixed wing portion 1102 about an example hinge line or hinge axis 1112. For example, the hinge interface 1110 of the foldable wing 1100 is located between (e.g., an outboard end of) the wing box 1106 and (e.g., an inboard end of) the tip box 1108.

To define the hinge interface 1110, the foldable wing 1100 includes a hinge 1114. Specifically, the hinge 1114 enables pivotal attachment of the foldable wing tip 1104 relative to the fixed wing portion 1102. Additionally, the hinge 1114 of the illustrated example locks or prevents pivotal movement of the foldable wing tip 1104 relative to the fixed wing portion 1102 along a latch axis 1116 of a latch interface 1118. The latch axis 1116 of the illustrated example is offset (e.g., laterally offset) relative to the hinge axis 1112. Specifically, the hinge axis 1112 is outboard of the latch axis 1116.

To define the hinge interface 1110, the fixed wing portion 1102 (e.g., the wing box 1106) defines a first wing hinge portion 1122 and a second wing hinge portion 1124 of the hinge interface 1110, and the foldable wing tip 1104 (e.g., the tip box 1108) defines a first tip hinge portion 1126, a second tip hinge portion 1128, and a third tip hinge portion 1130 of the hinge interface 1110. The third tip hinge portion 1130 of the illustrated example is positioned between the first tip hinge portion 1126 and the second tip hinge portion 1128. When the foldable wing tip 1104 is coupled to the fixed wing portion 1102, the first and second wing hinge portions 1122, 1124 are interleaved with the tip hinge portions 1126-1130. For example, at least a portion of the first wing hinge portion 1122 and/or at least a portion of the second wing hinge portion 1124 of the fixed wing portion 1102 extend into the foldable wing tip 1104, and at least a portion of the tip hinge portions 1126-1130 extend into the fixed wing portion 1102. Specifically, the first wing hinge portion 1122 is spaced from the second wing hinge portion 1124 to define a space or first opening 1132 therebetween to receive the third tip hinge portion 1130. The first tip hinge portion 1126 is spaced from the third tip hinge portion 1130 to define a space or first opening 1134 therebetween to receive the first wing hinge portion 1122. The second tip hinge portion 1128 is spaced from the third tip hinge portion 1130 to define a space or second opening 1136 therebetween to receive the second wing hinge portion 1124. Thus, the first wing hinge portion 1122 is positioned between the first tip hinge portion 1126 and the third tip hinge portion 1130, and the second wing hinge portion 1124 is positioned between the second tip hinge portion 1128 and the third tip hinge portion 1130. In some examples, the fixed wing portion 1102 includes only the first wing hinge portion 1122 and the foldable wing tip 1104 includes only the first tip hinge portion 1126 and the third tip hinge portion 1130. In some examples, the fixed wing portion 1102 includes the first wing hinge portion 1122 and the second wing hinge portion 1124 and the foldable wing tip 1104 includes only the third tip hinge portion 1130. In some examples, the fixed wing portion 1102 includes any number of wing hinge portions and the foldable wing tip 1104 includes any number of tip hinge portions.

The interleaved configuration does not increase an outer mold line (OML) of the foldable wing 1100. For example, the foldable wing 1100 of the illustrated example has a relatively smooth transition between the fixed wing portion 1102 and the foldable wing tip 1104. In other words, the hinge 1114 of the illustrated example does not interfere or affect aerodynamic characteristic(s) or performance of the foldable wing 1100. For example, the foldable wing tip 1104 is an extension of the fixed wing portion 1102 when the foldable wing tip 1104 is in an unfolded position. In some examples, an upper surface 1138 of the fixed wing portion 1102 forms a continuous surface relative to an upper surface 1140 of the foldable wing tip 1104. In the unfolded position, the foldable wing tip 1104 is part of an aerodynamic surface of the fixed wing portion 1102 that generates lift during flight. In some examples, approximately between 10% and 100% of the first and second wing hinge portions 1122, 1124 extend in the foldable wing tip 1104. In some examples, approximately between 10% and 100% of the tip hinge portions 1126-1130 extend in the fixed wing portion 1102. In some examples, each of the first and second wing hinge portions 1122, 1124 include a width (e.g., in a fore-aft direction) and/or length (e.g., in an inboard-outboard direction) that is different than a width (e.g., in the fore-aft direction) and/or a length (e.g., in an inboard-outboard direction) of respective ones of the tip hinge portions 1126-1130. In some examples, each of the first and second wing hinge portions 1122, 1124 include a width (e.g., in a fore-aft direction) and/or length (e.g., in an inboard-outboard direction) that is identical to a width (e.g., in a fore-aft direction) and/or length (e.g., in an inboard-outboard direction) of respective ones of the tip hinge portions 1126-1130. In some examples, the hinge axis 1112 and the latch axis 1116 are parallel relative to a fore-aft direction of the aircraft 100 (e.g., a direction of flight). In some examples, the hinge axis 1112 and the latch axis 1116 are parallel relative to an edge 1107 (e.g., a wing rib) of the wing box 1106 or an edge (e.g., awing rib) of the tip box 1108. In some examples, the hinge axis 1112 and/or the latch axis 1116 can have any other angle and/or orientation relative to the fore-aft direction. In some examples, the hinge axis 1112 is not parallel relative to the latch axis 1116.

Figure 12:
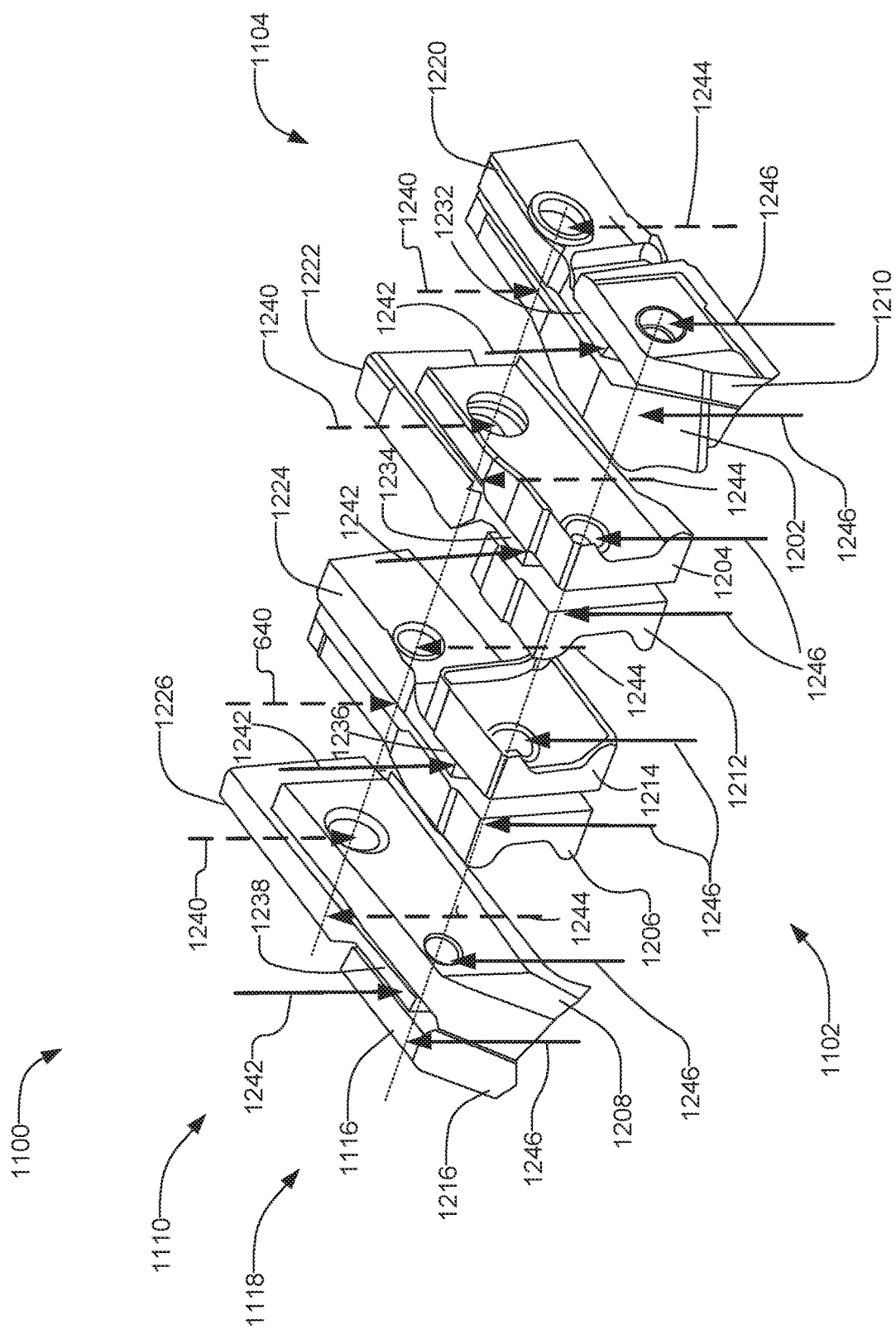
FIG. 12 is a partial, perspective view of an example hinge of FIG. 11.

FIG. 12 is a partial, perspective view of the hinge interface 1110 of FIG. 11, looking outboard toward the foldable wing tip 1104. The fixed wing portion 1102 (e.g., the wing box 1106) includes a first wing hinge rib 1202, a second wing hinge rib 1204, a third wing hinge rib 1206, a fourth wing hinge rib 1208, a first stub rib 1210, a second stub rib 1212, a third stub rib 1214 and a fourth stub rib 1216. For example, the first wing hinge portion 1122 (FIG. 11) includes the first wing hinge rib 1202 spaced from the second wing hinge rib 1204. The second wing hinge portion 1124 (FIG. 11) includes the third wing hinge rib 1206 spaced from the fourth wing hinge rib 1208. In some examples, the first wing hinge rib 1202 attaches to (e.g., abuts) or is formed with a front wing spar of the wing box 1106 and the fourth wing hinge rib 1208 attaches to (e.g., abuts) or is formed with a rear wing spar of the wing box 1106.

The foldable wing tip 1104 (e.g., the tip box 1108) includes a first tip hinge rib 1220, a second tip hinge rib 1222, a third tip hinge rib 1224, and a fourth tip hinge rib 1226. The first tip hinge portion 1126 (FIG. 11) includes the first tip hinge rib 1220 and the second tip hinge portion 1128 (FIG. 11) includes the fourth tip hinge rib 1226. In some examples, the first tip hinge rib 1220 attaches (e.g., abuts) to or is formed with a front spar of the tip box 1108 and the fourth tip hinge rib 1226 attaches to (e.g., abuts) or is formed with a rear spar of the tip box 1108. The third tip hinge portion 1130 (FIG. 11) includes the second and third tip hinge ribs 1222, 1224. The hinge interface 1110 receives a hinge pin assembly (e.g., the hinge pin assembly 702) and the latch interface 1118 receives a latch system (e.g., the latch system 800 and/or latch pins 802).

FIG. 12 illustrates wing hinge ribs 1202-1208 and wing stub ribs 1210-1216 relative to tip hinge ribs 1220-1226. For example, along the latch axis 1116, at least a portion 1232 (e.g., an end) of the first tip hinge rib 1220 is positioned between the first wing hinge rib 1202 and the first stub rib 1210, at least a portion 1234 (e.g., an end) of the second tip hinge rib 1222 is positioned between the second wing hinge rib 1204 and the second stub rib 1212, at least a portion 1236 (e.g., an end) of the third tip hinge rib 1224 is positioned between the third wing hinge rib 1206 and the third stub rib 1214, and at least a portion 1238 (e.g., an end) of the fourth tip hinge rib 1226 is positioned between the fourth wing hinge rib 1208 and the fourth stub rib 1216.

FIG. 12 also includes a schematic illustration of shear loads 1240 along the hinge interface 1110 and shear loads 1242 along the latch interface 1118. Specifically, the hinge interface 1110 and the latch interface 1118 are subjected to single-shear loading. The wing hinge ribs 1202-1208 and the tip hinge ribs 1220-1226 provide hinge pin reaction loads 1244 along the hinge interface 1110 to react the shear loads 1240. The hinge pin reaction loads 1244 (e.g., load vectors) are represented in FIG. 12 as dashed arrow lines. The wing hinge ribs 1202-1208 and the wing stub ribs 1210-1216 provide latch pin reaction loads 1246 along the latch interface 1118. The latch pin reaction loads 1246 (e.g., load vectors) are represented in FIG. 12 in solid arrow lines. Based on the configuration of the wing hinge ribs 1202-1208, the wing stub ribs 1210-1216, and the tip hinge ribs 1220-1226, the hinge pin reaction loads 1244 at the hinge interface 1110 are single-shear reaction loads and the latch pin reaction loads 1246 at the latch interface 1118 are double-shear reaction loads. For example, the wing hinge ribs 1202-1208 in conjunction with the corresponding wing stub ribs 1210-1216 provide a double-shear load path for the latch pins 802 (FIG. 8). Additionally, the hinge interface 1110 transfers loads from the foldable wing tip 1104 to the fixed wing portion 1102 when the foldable wing tip 1104 is in an unfolded position, a folded position, during flight, etc. For example, the hinge 1114 transfers or distributes loads from the foldable wing tip 1104 (e.g., the tip box 1108) to the fixed wing portion 1102 (e.g., the wing box 1106).

In some examples, the fixed wing portion 1102 can include any number of wing hinge portions (e.g., more than or less than the first and second wing hinge portions 1122, 1124) and/or the foldable wing tip 1104 can include any number of tip hinge portions (e.g., more than or less than the tip hinge portions 1126-1130). In some examples, the hinge interface 1110 configuration can be mirrored such that the fixed wing portion 1102 includes three wing hinge portions and the foldable wing tip 1104 includes two tip hinge portions. In some examples, the foldable wing 1100 can include any number of latch pins (e.g., 1, 2, 3, 4, 5, etc.) and/or any number of hinge pins (e.g., 1, 2, 3, 4, 5, etc.) to implement the hinge 1114.

From the foregoing, it will be appreciated that the disclosed hinge for foldable aircraft wings advantageously provides load paths to transfer loads from a foldable wing tip to a fixed wing portion. In some examples, the hinge includes a hinge interface that is to be subjected to single-shear loading. In some examples, the hinge includes a latch pin interface that is to be subjected to double-shear loading. In some examples, the hinge includes a tip transition portion and a wing transition portion that couple together to define the hinge interface and the latch pin interface. In some examples, the tip transition portion and the wing transition portion of the hinge includes multiple rib interfaces to provide load paths from a foldable wing tip to a fixed wing portion. In some examples, each of the rib interfaces are capable of transferring the loads across the hinge to provide a fail-safe. In some disclosed examples, the hinge pin interface is to enable the foldable tip to fold relative to the fixed wing or structure when the aircraft wing is not subjected to in-flight loads.

In some examples, an aircraft includes a foldable wing having a fixed wing portion, a foldable wing portion and a hinge to pivotally couple the foldable wing portion relative to the fixed wing portion. The hinge includes a wing transition portion including wing hinge ribs and wing stub ribs, respective ones of the wing hinge ribs coupled to corresponding respective ones of the wing stub ribs. The hinge also includes a tip transition portion including tip hinge ribs, where respective ends of the tip hinge ribs positioned between corresponding respective ones of the wing hinge ribs and the wing stub ribs.

In some examples, at least a portion of the hinge provides a double-shear reaction.

In some examples, the portion of the hinge that is to provide the double-shear reaction includes a latch interface.

In some examples, the hinge is to provide a primary load path to transfer a load from the foldable wing portion to the fixed wing portion.

In some examples, the hinge provides a primary wing bending/spanwise load path and a stream/chord wise stiffening load path.

In some examples, the respective ones of the wing hinge ribs are to couple to corresponding respective ones of the tip hinge ribs to define a hinge interface.

In some examples, the wing hinge ribs and the tip hinge ribs provide single-shear reaction at the hinge interface when the hinge interface is subjected to single-shear loading.

In some examples, a hinge pin assembly has a first hinge pin, a second hinge pin and a third hinge pin, where the first hinge pin is supported by a first wing hinge rib and a first tip hinge rib, the second hinge pin is supported by a second wing hinge rib and a second tip hinge rib, and the third hinge pin has a first end supported by a third wing hinge rib and a third tip hinge rib and a second end opposite the first end supported by a fourth wing hinge rib and a fourth tip hinge rib.

In some examples, the respective ones of the wing hinge ribs and wing stub ribs couple to corresponding respective ones of the tip hinge ribs along a latch interface.

In some examples, the wing hinge ribs and the wing stub ribs provide double-shear reaction at the latch interface when the latch interface is subjected to single-shear loading.

In some examples, at least one of the wing hinge ribs, the wing stub ribs and the tip hinge ribs includes a latch pin aperture.

In some examples, at least one of the wing hinge ribs and the tip hinge ribs includes a latch pin aperture to receive a latch pin.

In some examples, a foldable aircraft wing includes a foldable wing tip, a fixed wing portion, and a hinge to rotatably couple the foldable wing tip to the fixed wing portion. The hinge includes a wing transition portion including a first wing hinge rib, a second wing hinge rib, a third wing hinge rib, and a fourth wing hinge rib, the wing transition portion further including a first wing stub rib coupled to the first wing hinge rib, a second wing stub rib coupled to the second wing hinge rib, a third wing stub rib coupled to the third wing hinge rib, and a fourth stub hinge rib coupled to the fourth wing hinge rib. The hinge includes a tip transition portion including a first tip hinge rib, a second tip hinge rib, a third tip hinge rib and a fourth tip hinge rib, the first tip hinge rib coupled to the first wing hinge rib and the first hinge stub rib, the second tip hinge rib coupled to the second wing hinge rib and the second hinge stub rib, the third tip hinge rib being coupled to the third wing hinge rib and the third hinge stub rib, and the fourth tip hinge rib being coupled to the fourth wing hinge rib and the fourth hinge stub rib.

In some examples, at least one of the first wing hinge rib, the second wing hinge rib, the third wing hinge rib, the fourth wing hinge rib, the first tip hinge rib, the second tip hinge rib, the third tip hinge rib, and the fourth tip hinge rib includes a hinge pin aperture that aligns to receive a hinge pin assembly at a hinge interface.

In some examples, the hinge interface provides a single-shear reaction when the hinge interface is subjected to single-shear loading.

In some examples, at least one of the first wing stub rib, the second wing stub rib, the third wing stub rib, the fourth wing stub rib, the first tip hinge rib, the second tip hinge rib, the third tip hinge rib, and the fourth tip hinge rib includes a latch pin aperture that aligns to receive a latching pin at a latch interface.

In some examples, the latch interface provides a double-shear reaction when the latch interface is subjected to single-shear loading.

In some examples, the second stub rib supports a first stop pad and the third stub rib supports a second stop pad.

In some examples, the second tip hinge rib supports a third stop pad and the third hinge rib supports a fourth stop pad.

In some examples, the first stop pad is to engage the third stop pad and the second stop pad is to engage the fourth stop pad when the foldable aircraft wing is in an unfolded position, engagement between the first and third stop pads and the second and fourth stop pads provide a load path between the foldable wing tip and the fixed wing portion.

In some examples, a method of enhancing a structural integrity of a fixed wing portion and a foldable wing tip at wing joint includes: coupling a portion of an end of a tip hinge rib of a foldable wing tip between a wing hinge rib and a stub hinge rib of fixed wing portion, the wing hinge rib and the stub hinge rib to provide a double-shear reaction when the portion of the end of the tip hinge rib is subjected to single-shear loading to reduce or restrict transfer of prying forces into latch pin actuators, positioned adjacent the portion of the end of the tip hinge rib.

In some examples, the method includes pivotally coupling the foldable wing tip and the fixed wing portion via a hinge pin assembly passing through a hinge aperture of the wing hinge rib and the tip hinge rib.

In some examples, a foldable wing for an aircraft includes a fixed wing portion including wing hinge ribs and wing stub ribs, where respective ones of the wing hinge ribs are coupled to corresponding respective ones of the wing stub ribs. The foldable wing includes a foldable wing portion, including tip hinge ribs, where respective ends of the tip hinge ribs are positioned between corresponding respective ones of the wing hinge ribs and the wing stub ribs. A hinge is to pivotally couple the foldable wing portion relative to the fixed wing portion.

In some examples, the portion of the hinge that is to provide the double-shear reaction includes a latch interface.

In some examples, the hinge includes one or more hinge pins to pass through openings formed in respective ones of the wing hinge ribs and the tip hinge ribs.

In some examples, the foldable wing includes a latch movable between a latched position to prevent pivotal movement of the foldable wing portion and the fixed wing portion about the hinge and an unlatched position to enable pivotal movement of the foldable wing portion relative to the fixed wing portion about the hinge.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
a foldable wing including a fixed wing portion, a foldable wing portion and a hinge to pivotally couple the foldable wing portion relative to the fixed wing portion, the hinge including:
a wing transition portion including wing hinge ribs and wing stub ribs, respective ones of the wing hinge ribs coupled to corresponding respective ones of the wing stub ribs; and
a tip transition portion including tip hinge ribs, respective ends of the tip hinge ribs positioned between corresponding respective ones of the wing hinge ribs and the wing stub ribs, wherein the respective ones of the wing hinge ribs are to couple to corresponding respective ones of the tip hinge ribs to define a hinge interface, and wherein the wing hinge ribs and the tip hinge ribs provide single-shear reaction at the hinge interface when the hinge interface is subjected to single-shear loading.

2. The aircraft of claim 1, wherein at least a portion of the hinge provides a double-shear reaction.

3. The aircraft of claim 2, wherein the portion of the hinge that is to provide the double-shear reaction includes a latch interface.

4. The aircraft of claim 1, wherein the hinge is to provide a primary load path to transfer a load from the foldable wing portion to the fixed wing portion.

5. The aircraft of claim 4, wherein the hinge provides a primary wing bending/spanwise load path and a stream/chord wise stiffening load path.

6. The aircraft of claim 1, further including a hinge pin assembly having a first hinge pin, a second hinge pin and a third hinge pin, the first hinge pin supported by a first wing hinge rib and a first tip hinge rib, the second hinge pin supported by a second wing hinge rib and a second tip hinge rib, and the third hinge pin having a first end supported by a third wing hinge rib and a third tip hinge rib and a second end opposite the first end supported by a fourth wing hinge rib and a fourth tip hinge rib.

7. An aircraft comprising:
a foldable wing including a fixed wing portion, a foldable wing portion and a hinge to pivotally couple the foldable wing portion relative to the fixed wing portion, the hinge including:

a wing transition portion including wing hinge ribs and wing stub ribs, respective ones of the wing hinge ribs coupled to corresponding respective ones of the wing stub ribs; and a tip transition portion including tip hinge ribs, respective ends of the tip hinge ribs positioned between corresponding respective ones of the wing hinge ribs and the wing stub ribs, wherein the respective ones of the wing hinge ribs and wing stub ribs couple to corresponding respective ones of the tip hinge ribs along a latch interface, and wherein the wing hinge ribs and the wing stub ribs provide double-shear reaction at the latch interface when the hinge is subjected to single-shear loading.

8. The aircraft of claim 7, wherein at least one of the wing hinge ribs, the wing stub ribs and the tip hinge ribs includes a latch pin aperture.

9. The aircraft of claim 8, wherein at least one of the wing hinge ribs and the tip hinge ribs includes a latch pin aperture to receive a latch pin.

10. A foldable aircraft wing, comprising:
a foldable wing tip;
a fixed wing portion; and
a hinge to rotatably couple the foldable wing tip to the fixed wing portion, the hinge including:
a wing transition portion including a first wing hinge rib, a second wing hinge rib, a third wing hinge rib, and a fourth wing hinge rib, the wing transition portion further including a first wing stub rib coupled to the first wing hinge rib, a second wing stub rib coupled to the second wing hinge rib, a third wing stub rib coupled to the third wing hinge rib, and a fourth stub hinge rib coupled to the fourth wing hinge rib; and
a tip transition portion including a first tip hinge rib, a second tip hinge rib, a third tip hinge rib and a fourth tip hinge rib, the first tip hinge rib coupled to the first wing hinge rib and the first hinge stub rib, the second tip hinge rib coupled to the second wing hinge rib and the second hinge stub rib, the third tip hinge rib being coupled to the third wing hinge rib and the third hinge stub rib, and the fourth tip hinge rib being coupled to the fourth wing hinge rib and the fourth hinge stub rib, wherein at least one of the first wing hinge rib, the second wing hinge rib, the third wing hinge rib, the fourth wing hinge rib, the first tip hinge rib, the second tip hinge rib, the third tip hinge rib, and the fourth tip hinge rib includes a hinge pin aperture that aligns to receive a hinge pin assembly at a hinge interface, and wherein the hinge interface provides a single-shear reaction when the hinge interface is subjected to single-shear loading.

11. The foldable aircraft wing of claim 10, wherein the wing transition portion supports a first stop pad and the tip transition portion supports a second stop pad.

12. The foldable aircraft wing of claim 11, wherein the first stop pad is to engage the second stop pad when the foldable aircraft wing is in an unfolded position, engagement between the first and second stop pads to provide a load path between the foldable wing tip and the fixed wing portion.

13. A foldable aircraft wing, comprising:
a foldable wing tip;
a fixed wing portion; and
a hinge to rotatably couple the foldable wing tip to the fixed wing portion, the hinge including:
a wing transition portion including a first wing hinge rib, a second wing hinge rib, a third wing hinge rib, and a fourth wing hinge rib, the wing transition portion further including a first wing stub rib coupled to the first wing hinge rib, a second wing stub rib coupled to the second wing hinge rib, a third wing stub rib coupled to the third wing hinge rib, and a fourth stub hinge rib coupled to the fourth wing hinge rib; and
a tip transition portion including a first tip hinge rib, a second tip hinge rib, a third tip hinge rib and a fourth tip hinge rib, the first tip hinge rib coupled to the first wing hinge rib and the first hinge stub rib, the second tip hinge rib coupled to the second wing hinge rib and the second hinge stub rib, the third tip hinge rib being coupled to the third wing hinge rib and the third hinge stub rib, and the fourth tip hinge rib being coupled to the fourth wing hinge rib and the fourth Response to the official action dated Feb. 23, 2022 hinge stub rib, wherein at least one of the first wing stub rib, the second wing stub rib, the third wing stub rib, the fourth wing stub rib, the first tip hinge rib, the second tip hinge rib, the third tip hinge rib, and the fourth tip hinge rib includes a latch pin aperture that aligns to receive a latching pin at a latch interface wherein the latch interface provides a double-shear reaction when the hinge is subjected to single-shear loading.

14. A method of enhancing a structural integrity of a fixed wing portion and a foldable wing tip at wing joint, the method comprising:
coupling a portion of an end of a tip hinge rib of a foldable wing tip between a wing hinge rib and a stub hinge rib of a fixed wing portion, the wing hinge rib and the stub hinge rib to provide a double-shear reaction when the portion of the end is subjected to single-shear loading to reduce or restrict transfer of prying forces into latch pin actuators positioned adjacent the at least the portion of the end of the tip hinge rib.

15. The method of claim 14, further including pivotally coupling the foldable wing tip and the fixed wing portion via a hinge pin assembly passing through an aperture of the wing hinge rib and the tip hinge rib.

* * * * *

UNITED STATES PATENT AND TRADEMARK OFFICE
CERTIFICATE OF CORRECTION

PATENT NO. : 11,485,474 B2
APPLICATION NO. : 16/580762
DATED : November 1, 2022
INVENTOR(S) : Dees et al.

Page 1 of 1

It is certified that error appears in the above-identified patent and that said Letters Patent is hereby corrected as shown below:

In the Claims

In Column 16, Lines 29-30, Claim 13, delete the phrase "Response to the official action dated Feb. 23, 2022" between "the fourth" and "hinge stub rib".

Signed and Sealed this
Twenty-fifth Day of July, 2023

Katherine Kelly Vidal
*Director of the United States Patent and Trademark Office*